United States Patent [19]
Long

[11] Patent Number: 5,111,926
[45] Date of Patent: May 12, 1992

[54] SINGULATING AND ORIENTING SLIDE CONVEYOR

[75] Inventor: William C. Long, Houston, Tex.

[73] Assignee: ESM International Inc., Houston, Tex.

[21] Appl. No.: 741,665

[22] Filed: Aug. 7, 1991

[51] Int. Cl.⁵ .......................................... B65G 47/24
[52] U.S. Cl. ..................... 193/46; 209/539; 209/911
[58] Field of Search ............ 198/417; 193/46; 209/580, 581, 539, 911

[56] References Cited

U.S. PATENT DOCUMENTS

| | | | |
|---|---|---|---|
| 1,480,898 | 1/1924 | Denmire | 193/46 X |
| 2,767,881 | 10/1956 | Gruenberg | 193/46 X |
| 3,990,580 | 11/1976 | Self | 209/580 X |
| 4,624,368 | 11/1986 | Satake | 209/581 |
| 4,697,709 | 10/1987 | Codding | 209/581 X |
| 4,699,273 | 10/1987 | Suggi-Liverani et al. | 209/580 |

Primary Examiner—D. Glenn Dayoan
Attorney, Agent, or Firm—Vaden, Eickenroht, Thompson & Boulware

[57] ABSTRACT

A slide conveyor for an optical sorting machine is disclosed wherein the conveyor is gently twisted over its length by about 85 degrees. The conveyor is channel-like in that it has two sides converging at its U-shaped bottom at an acute angle. The angle has a radius much smaller than the radius of the convex flat side, but slightly larger than the radius of the smallest edge angle radius of the slightly convex, disc-like products being conveyed. At the upper end, the centerline of the bottom angle is vertical and at its lower end, positioned just above the viewing station of the optical sorter, the centerline is about 5 degrees above horizontal. The conveyor slopes at a grade of about 75 degrees. The conveyor both singulates and orients the products conveyed.

6 Claims, 3 Drawing Sheets

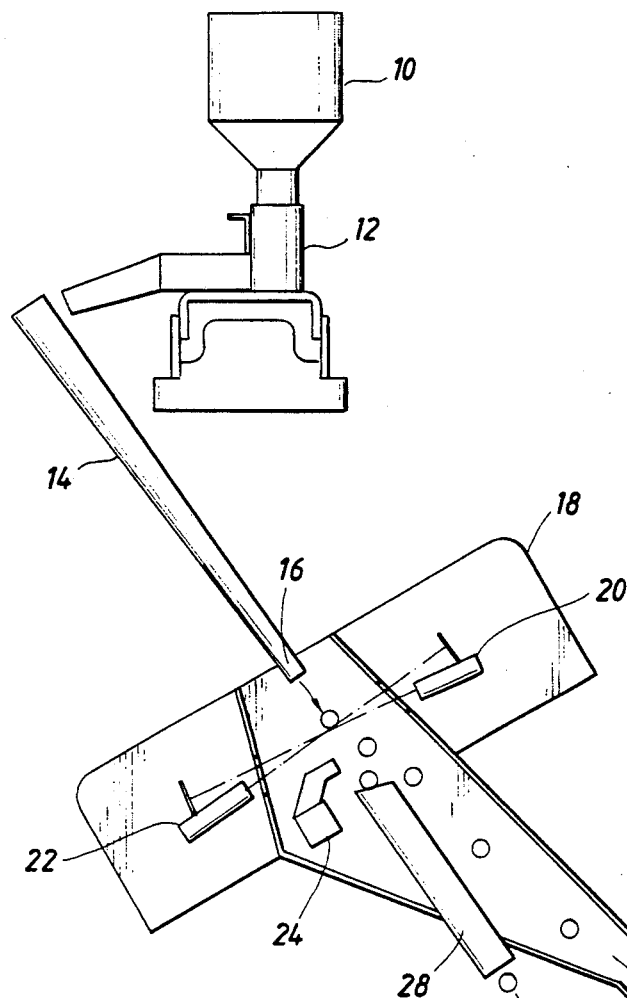
FIG. 1
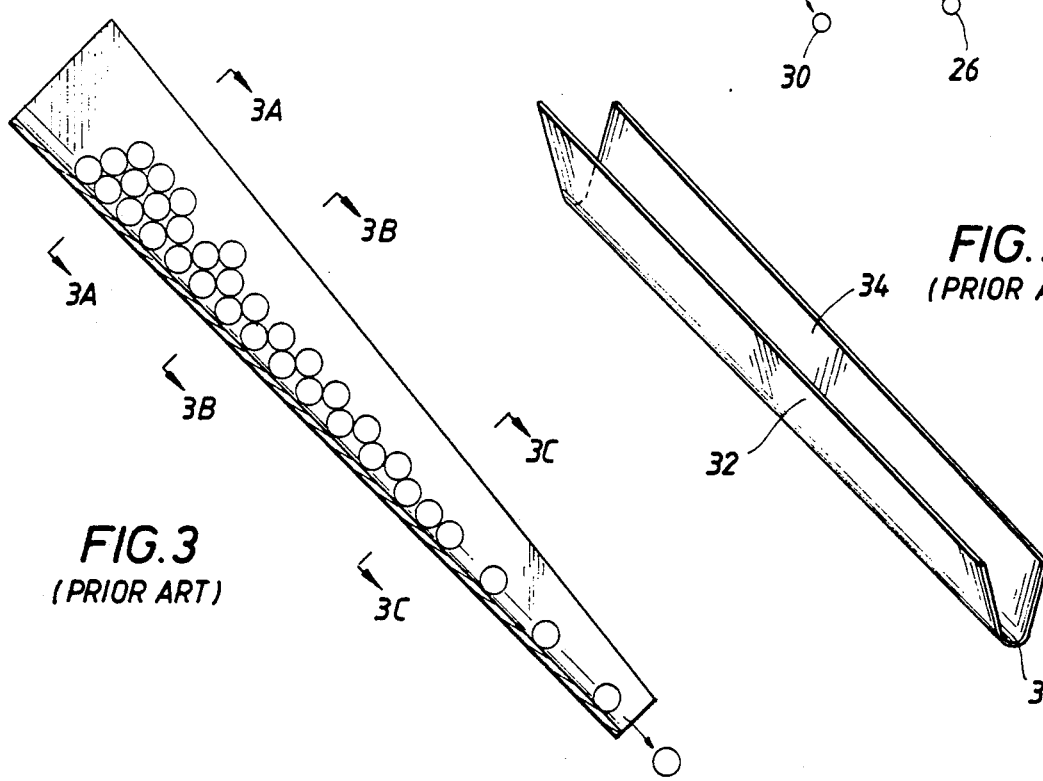
FIG. 2 (PRIOR ART)
FIG. 3 (PRIOR ART)

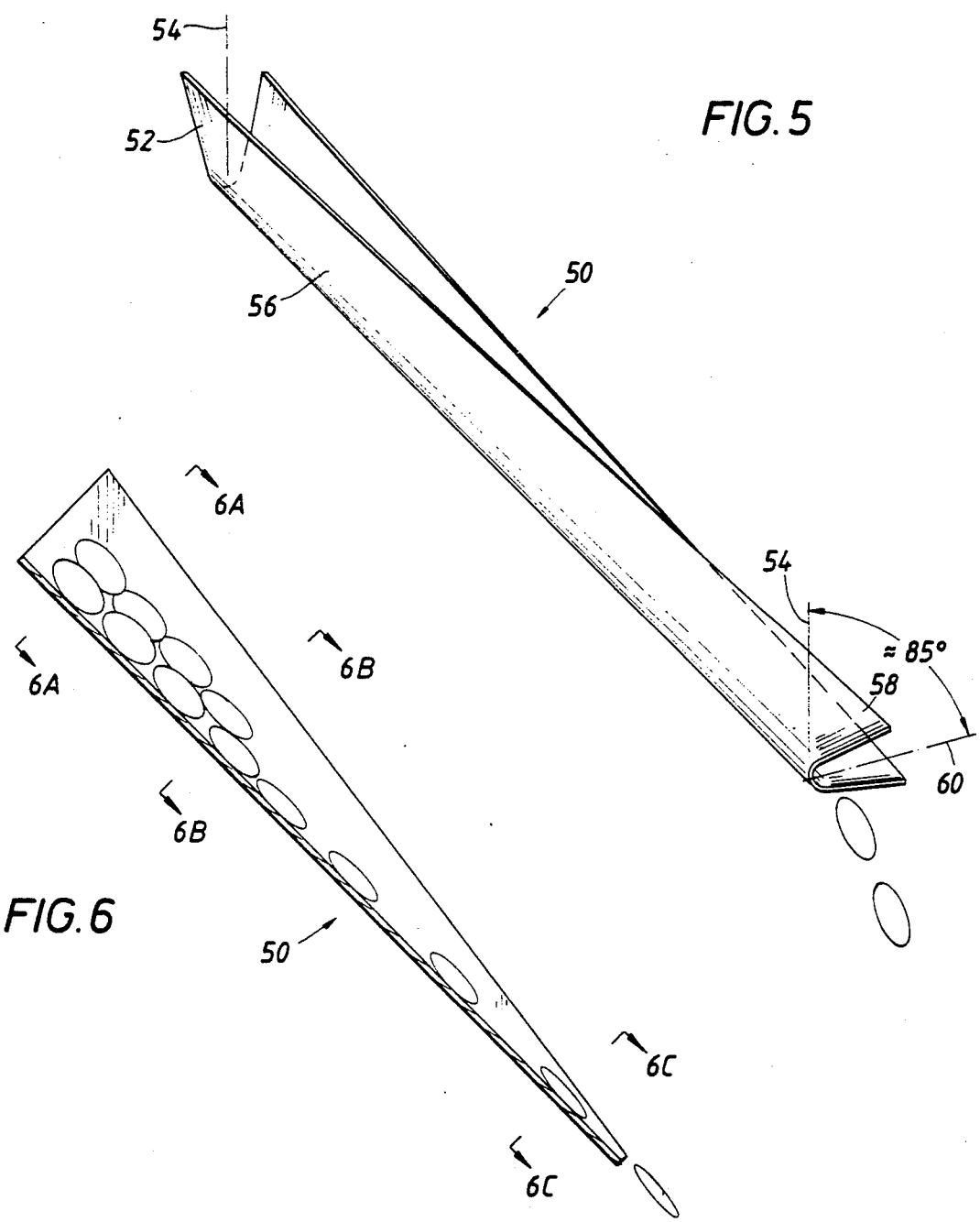
FIG. 5
FIG. 6
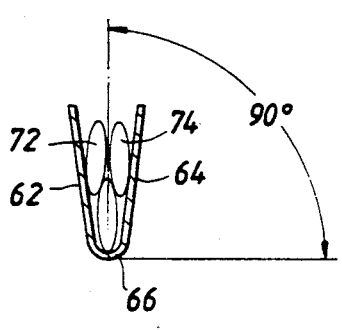
FIG. 6A
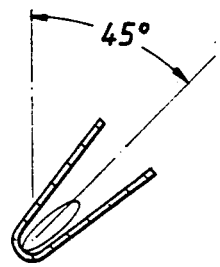
FIG. 6B
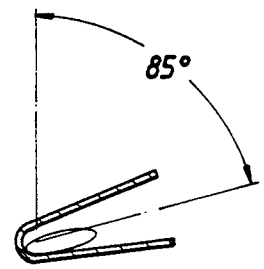
FIG. 6C

SINGULATING AND ORIENTING SLIDE CONVEYOR

BACKGROUND OF THE INVENTION

1. Field of the Invention

This invention pertains to apparatus for conveying small fungible products for optical sorting and more specifically for singulating such products as broad beans, almonds and the like that often do not singulate or separate from each other when conveyed in conventional fashion.

2. Description of the prior art

Small fungible products are conventionally inspected and sorted by optical viewing means by being conveyed down an appropriate chute or slide past the optical viewing station. Conventional sorting machine electronics operate on the principle that one product at a time passes the viewing station even though a stream of such products occurs so fast that the naked eye cannot separate one conveyed product from another. A prior art slide conveyor for conveying such items as coffee beans or other such products, both agricultural and non-agricultural, has a U-shaped cross section with a relatively large bottom radius. That is, the sides of the slide slope inwardly toward each other at an acute angle, but at an angle that is larger than the largest radius of the products being conveyed. A bean, for example, is generally spherical and is shaped to have a long axis and a short axis, the short axis generally subtending an arc that has a smaller radius than the arc generally subtended by the long axis. The U-shaped bottom of a conventional conveyor has a radius that is larger than even the products large radius.

The conventional conveyor is positioned at an angle to a level floor in excess of 45 degrees. The entrance to the slide conveyor is conventionally fed by a hopper- and vibratory feeder that dumps a relatively large quantity onto the slide at one time. As the products slide or roll down the slide, they gradually unstack themselves so that by the time they pass by the viewing station of the sorter, the products are no longer overlapping each other. This permits the electronics of the machine to consider each viewed object on its own merits. Thus, if a viewed product is too short, too long, has too large a dark spot, or too large a light spot or is too light or too dark overall, the reject mechanism for separating the "substandard" or "nonstandard" product, usually an air jet, is only actuated to remove the nonstandard product and not others. By contrast, a slide that does not adequately singulate in the fashion just described can produce a bunching of products that will be detected as too long for a single product and, therefore, cause a rejection that never should have occurred at all. This bunching of product can also "hide" defects from the optics, and cause the machine to accept "bad" product.

It should be noted that a conventional slide of the type just described does not particularly orient the spherical shaped products assumed above as they emerge or pass from the exit of the slide. That is, if the products tend to be a little longer in one dimension than another, some will slide off or roll off one way and others will slide off or roll off oriented differently. That is, there is no uniform or consistent orientation of the products even though they are singulated. In many applications, this does not make any difference, but in some applications where the products are more disc shaped than spherical shaped, it very well may be important to optical viewing.

It should also be noted that products that are more disc-shaped, with or without a pointed end, than spherical shaped do not consistently singulate in the type of slide just described. For example, broad beans are substantially disc shaped, somewhat like a miniature discuss wherein the sides are slightly convex although referred to loosely as being flat. The edges have a small radius, actually much smaller than a spherical product of the type discussed above. Almonds are also somewhat disc shaped in the same manner as broad beans, however, almonds also have a pointed end. When broad beans, almonds, or similar "flat" sided disc-like products are conveyed down a conveyor of the conventional type previously described, sometimes two or three of such products will wedge together in the U-shaped bottom. Other times, one such product will straddle the bottom angle and skid along the sides with or without other of such products. When either of these randomly occurring events happens, then the slide does not function to singulate the products and the products exiting will often be bunched together. As described above, bunched products can result in erroneous rejection or sorting of individually standard-sized products. Moreover, products that exit after straddling the bottom can be viewed as substandard in width compared with products that are oriented to be approximately in a plane bisecting the bottom angle of the slide.

Therefore, it is a feature of the present invention to provide an improved slide for sorting machines that dependably singulates and orients products that are more disc-like than spherical-like.

It is another feature of the present invention to provide an improved slide for sorting machines that dependably presents the "flat" side of disc-like products for optical view sorting, regardless of whether the products also have a pointed end.

It is still another feature of the present invention to provide an improved slide for sorting machines of the type described above without resorting to auxiliary moving parts.

SUMMARY OF THE INVENTION

The slide conveyor in accordance with the current invention can be considered as comprising four parts, namely, a bottom, an upper section, a lower section, and an intermediate section. The bottom has a U-shaped cross section that has a radius that is much less than the radius of the convex flat side, but slightly larger than the radius of the edge of the disc-shaped products that are sorted. The upper section of the conveyor that receives the mass of products, usually from a hopper/vibrator input means, is aligned in the normal way, that is, with a line bisecting the angle of the U-shaped bottom being perpendicular. As the products slide down this upper section, they tend to more or less turn on edge so that they approximately line up on edge parallel with the bisecting line. The intermediate section of the slide curves or turns slowly so that the products are still held by gravity against the bottom, but the bottom is now at an angle of about 45 degrees with respect to the top section. Finally, the bottom section causes the emergence of the products to the optical viewing station so that the broad sides of the products are presented for optical viewing. This means that the line of the viewing element is approximately normal or perpendicular to the approximate plane of the large sides of the products.

The gentle twist or turning or curving of the slide from the upper section to the intermediate section to the lower section is sufficiently gentle or gradual that there is no sharp delineation from one section to the next. Products that did not completely separate themselves from each other in the upper section can be shown to accomplish such separation during the course of travelling through the intermediate and lower sections so that as they emerge they are singulated and their large, flat sides are consistently presented for viewing. In the event of conveying products that are pointed, the points are generally oriented to be axially parallel with the U-shaped bottom at the time of exit or emergence from the lower section.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiment thereof which is illustrated in the drawings, which forms a part of this specification. It is to be noted, however, that the appended drawings illustrate only a typical preferred embodiment of the invention and are not to be considered limiting of its scope as the invention may admit to other equally effective embodiments.

In the drawings:

FIG. 1 is a schematic diagram of a sorting machine utilizing a slide conveyor as a device for presenting small fungible products or articles in singulating fashion before an optical viewing station.

FIG. 2 is an isometric view of a slide conveyor in accordance with the prior art.

FIG. 3 is a graphical representation of how the slide conveyor shown in FIG. 2 singulates spherically shaped products.

FIG. 5 is an isometric view of a slide conveyor in accordance with the present invention.

FIG. 6 is a graphical representation of how the slide conveyor shown in FIG. 5 singulates and orients flat, disc-shaped products.

FIGS. 6A, 6B, and 6C are cross-sectional views of the slide conveyor action shown in FIG. 6 at three different locations along its length.

DESCRIPTION OF THE PREFERRED EMBODIMENT

Figure 3A:
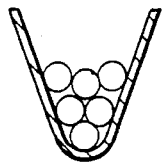
FIGS. 3A, 3B, and 3C are cross-sectional views of the slide conveyor action shown in FIG. 3 at three different locations along its length.

Now referring to the drawings and first to FIG. 1, a diagram is shown of the basic components of an optical/electronic sorting machine with which a slide conveyor is employed for presenting singulated spherical products to an optical viewing station. Suitable products that have been singulated and sorted with such equipment have included coffee beans, peanuts, and like spherically-shaped products. The process involves the placement of a large mass or quantity of such products in hopper 10, which by gravity action are dispensed through the bottom of the hopper to vibratory feeder 12, which shakes the products onto the entrance or top end of slide conveyor 14.

The products slide and roll down the slide conveyor separating themselves from each other in a manner described hereinafter so as to emerge in singulated fashion from exit end 16 of conveyor 14 and so as to present the product stream to optical viewing station 18. The products are viewed by one or more optical viewers 20 and 22. In the drawing, viewer 20 is a front viewer and viewer 22 is a rear viewer.

When a nonstandard or substandard product in the product stream passing through the optical viewing station is detected, the electronics therein activate a reject mechanism, normally an air ejector, to blow or otherwise remove the nonstandard product from the stream. The rejected product stream 26 is shown deflected to the right lower side of the drawing. The products that are not rejected continue in slide conveyor extension 28 to eventually exit or emerge in product stream 30.

The system just described has many variation, such as multiple parallel slide conveyors being included on the same machines, stacked slide conveyors being located so that each accepted product has to pass through two optical viewing and sorting actions, and reverse reject-/accept action where the rejected products are not deflected and the accepted products are. However, these alternatives and other alternatives all utilize at least one slide conveyor for singulating the products. A prior art slide conveyor used for this purpose is shown in isometric view in FIG. 2 and is shown acting on spherical products in FIGS. 3, 3A, 3B, and 3C.

Figure 3B:
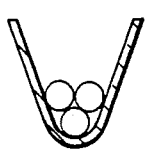
Figure 3C:
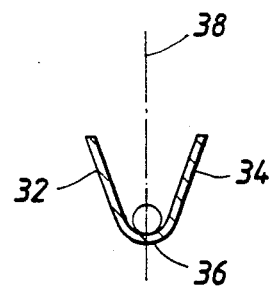

Basically, the prior art slide conveyor is a one-piece channel having opposite sides 32 and 34 that join or converge together at a U-shaped bottom 36. A center line 38 bisecting the slide conveyor bottom angle is vertical, as shown, for example, in FIG. 3C. The angle of convergence, as best shown in FIGS. 3A, 3B, and 3C, is an acute angle having a larger radius than the radius of even the largest radius of the spherical products. The side dimension at the top of the slide conveyor is typically larger than at the exit, as shown in FIG. 3, since the products are initially bunched together in this upper section portion of the slide conveyor. Products may, in effect, be stacked several products deep in this initial or entrance area. As the products progress down the conveyor, they roll and slide and bump up against one another. The ones in greatest surface contact with the conveyor progress the slowest such that, provided the conveyor is long enough, they are singulated by the time that the stream of products emerge from the end of the conveyor. There is no opportunity for spherical products to wedge or lock in place vis-a-vis one or more other products, as shown by FIGS. 3A, 3B, and 3C, which shows a progression of the mass of products as the stream moves down the conveyor.

What is perfectly satisfactory for spherical products, however, is not satisfactory for singulating such products as broad beans, almonds and the like. These products are disc-like in shape and have two "flat" sides and a relatively thin edge. Actually, the sides are slightly convex and in the case of almonds, one edge comes to a point. In any case, there is a long axis from edge to edge, a short axis from side to side and a smaller edge radius than with spherical products of the same mass.

FIGS. 4, 4A, 4B, and 4C illustrate the conditions that exist on a slide conveyor of the type shown in FIGS. 2 and 3 when such disc-shaped products are conveyed. First, there is very little rolling possible. The products tend to slide. In some cases the products will align approximately parallel to the sides or walls of the conveyor, as shown for products 39, 40, and 41 in the bottom group of products shown in FIG. 4B. In some cases, the products bridge from side to side across the bottom U-shaped channel, such as shown for product 42 in FIG. 4C. Sometimes, two such products will lie on a bridging product, such as in the case for products 43 and 44 shown in FIG. 4C. In all such cases, there is not the relative friction and rolling actions that caused separation or singulation of spherical products, as shown in FIGS. 3, 3A, 3B, and 3C. Thus, the products often exit or emerge at the lower end of the slide conveyor in overlapping bunches, such as shown for bunch 46 in FIG. 4.

Optical viewing electronics operate in various operating modes; however, generally, the viewing for nonstandard products is for spots of unacceptable size and color and/or products that are outside of a predefined dimension range. When products emerge before the optical viewing station in bunched form, spots are often hidden from view. Also, detecting the ends of the bunch will indicate a "product" that is too long since the end-to-end dimension is often longer than for a single standard product. Thus, the conveyor shown in FIG. 4 is not acceptable for singulating disc-like products.

Figure 4:
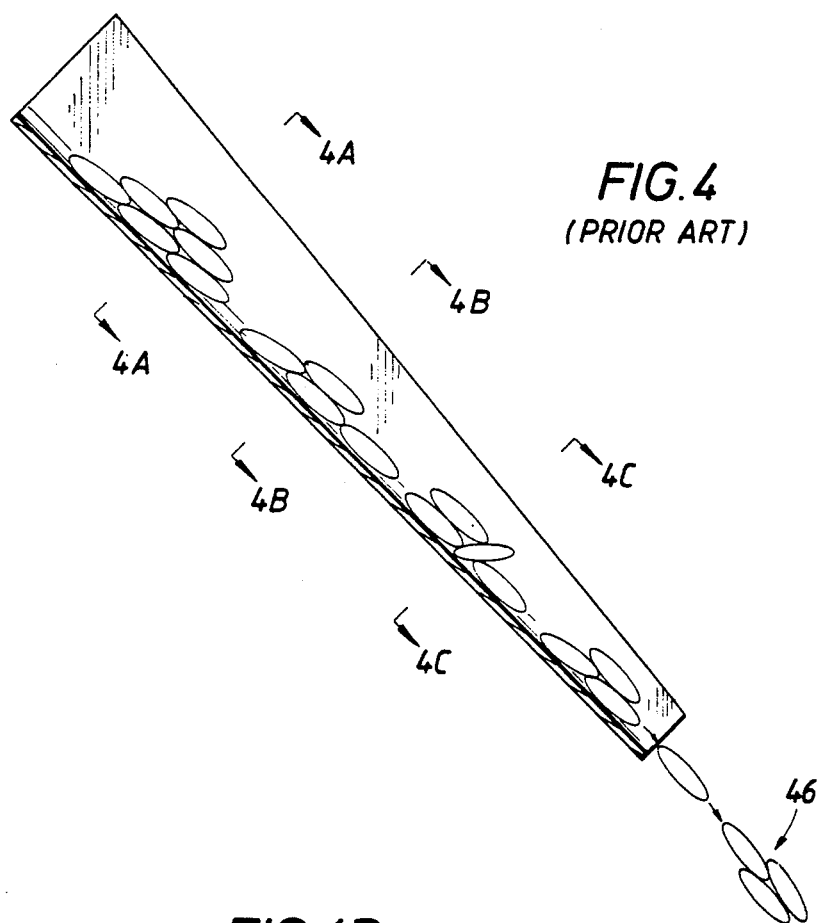
FIG. 4 is a graphical representation of how the slide conveyor shown in FIG. 2 would handle flat, disc-shaped products in a manner that would not guarantee singulation.
Figure 4A:
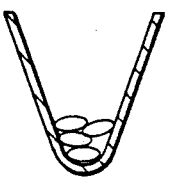
FIGS. 4A, 4B, and 4C are cross-sectional views of the slide conveyor action shown in FIG. 4 at three different locations along its length.
Figure 4B:
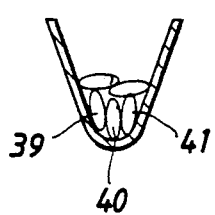
Figure 4C:
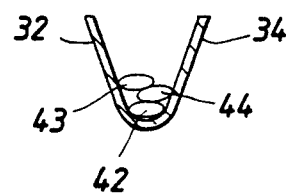

Now referring to FIG. 5, a conveyor much like that of FIG. 4 is shown; however, in this case, slide conveyor 50 is gently or gradually twisted from its top or upper entrance end to its exit or emergence end by approximately 85 degrees. Although normally one piece, the conveyor can be thought of as being three sequential pieces or sections. The overall slope of the conveyor remains the same as for the FIG. 2-3 conveyor, normally over 45 degrees and usually about 75 degrees. However, in this case, upper end 52 is aligned with a centerline 54 bisecting its bottom angle being vertical; intermediate section 56 gradually rolling this center line to one side (in this case, to the right); and lower section 58 having its center line 60 at about an 85 degree rotation from the position of original center line 54. Thus, the centerline is about 5 degrees above horizontal or being level with the floor. Although this amount of rotation is preferred, a range from 75-90 degrees is acceptable.

Now referring to FIGS. 6, 6A, 6B, and 6C, the action of such a conveyor as shown in FIG. 5 is illustrated with respect to a stream of disc-like products. It should also be noted that in addition to being twisted, conveyor sides 62 and 64 join or converge in an angle at U-shaped bottom at more of an acute angle than did sides 32 and 34 shown in FIG. 3C. The radius of the bottom angle is much less than the radius of the convex flat side, but slightly larger than the smallest or edge radius of the disc-like products to be conveyed.

As shown in FIG. 6A, it is very possible for three products to bunch up at the entrance to conveyor 50, one product 70 being on edge in the U-shaped bottom and products 72 and 74 being between product 70 and a respective wall or side 62 and 64 of the conveyor. In such case, sides 62 and 64 present more surface to the sides of products 72 and 74 than bottom 66 presents to the edge of product 70. Thus, there is uneven friction on the products that causes them to slide at slightly different rates to begin with.

As the products rotate with the intermediate section of the conveyor, the weight distribution becomes uneven, wedging tighter some products and loosening others. Thus, the products slide unevenly to cause further separation. This process continues in the lower section, with even more separation being the result. At all times up until at least the end of the lower section, the angle of the bottom center line is slightly above horizontal to prevent the products from dropping out of the slide conveyor.

When the products emerge or exit from the bottom section of the conveyor, the products are all aligned to present their broad or "flat" (slightly convex) sides to the optical viewer. This is an advantage since the electronics can operate in the knowledge or assumption that the products will not be presented in the viewing station on edge. Pointed edges, such as occur with almonds, will also be presented either down or up or parallel with the elongate axis of the conveyor. Thus, in all cases, the products are singulated. In all cases, the products are oriented so that their broad sides are normal to a line to the optical viewing instrument located directly on line with the centerline of the lower section of the conveyor. In the cases of slightly pointed products, these products are additionally oriented with their points along the axis of the conveyor.

While a preferred embodiment of the invention has been described and illustrated, it will be understood that the invention is not limited thereto, since many modifications may be made and will become apparent to those skilled in the art. For example, the intermediate section of the slide can be twisted to the left, rather than to the right, if desired.

What is claimed is:

1. A slide conveyor for singulating and orienting small, approximately flat fungible products for viewing in an optical sorting machine, the conveyor being connected for receiving a large quantity of the products and conveying the products by gravity action, the conveyor comprising
   a narrow U-shaped bottom for accepting the products on edge and not crosswise,
   an upper section for receiving the products oriented so that a line bisecting the angle of said U-shaped bottom in said upper section is substantially vertical so as to at least approximately vertically orient the flat sides of the products as they pass through said upper section,
   a lower section of the conveyor oriented so that the flat sides of the products are oriented at least approximately normal to vertical for flat side optical viewing as they emerge from said lower section, and
   an intermediate section of the conveyor gradually curvingly joining said upper section to said lower section.

2. A slide conveyor in accordance with claim 1, wherein the products are approximately disc-shaped with convex sides.

3. A slide conveyor in accordance with claim wherein the products have convex sides and at least one gradually pointed end.

4. A slide conveyor in accordance with claim wherein the radius of said bottom is much less than the radius of the flat side, but slightly larger than the edge radius of the products.

5. A slide conveyor in accordance with claim wherein the bottom of the entrance to said upper section is in the range between 75 degrees and 90 degrees with respect to the bottom of the exit of said lower section.

6. A slide conveyor in accordance with claim 5, wherein the bottom of the entrance to said upper section is approximately 85 degrees with respect to the bottom of the exit of said lower section.

* * * * *